United States Patent
Fujimoto

(10) Patent No.: US 8,511,653 B2
(45) Date of Patent: Aug. 20, 2013

(54) AIR SPRING

(75) Inventor: Kenji Fujimoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 28 days.

(21) Appl. No.: 13/150,441

(22) Filed: Jun. 1, 2011

(65) Prior Publication Data

US 2012/0056362 A1 Mar. 8, 2012

(30) Foreign Application Priority Data

Sep. 6, 2010 (JP) ................................ 2010-198688

(51) Int. Cl.
*F16F 9/04* (2006.01)

(52) U.S. Cl.
USPC ...... 267/64.27; 267/35; 267/64.19; 267/64.2; 267/64.28

(58) Field of Classification Search
USPC ..................................... 267/35, 64.19–64.28
See application file for complete search history.

(56) References Cited

U.S. PATENT DOCUMENTS

| | | | |
|---|---|---|---|
| 6,257,561 B1 * | 7/2001 | Nakayama et al. ........ | 267/64.19 |
| 6,460,836 B1 * | 10/2002 | Trowbridge ............... | 267/64.27 |
| 7,150,451 B2 * | 12/2006 | Soles et al. ................ | 267/64.27 |
| 2003/0116898 A1 * | 6/2003 | Leonard et al. ............ | 267/64.27 |

FOREIGN PATENT DOCUMENTS

| | | | |
|---|---|---|---|
| JP | 57-155340 | | 9/1982 |
| JP | 404060232 A | * | 2/1992 |
| JP | 09-089029 | | 3/1997 |
| JP | 10288236 A | * | 10/1998 |
| JP | 2002-206582 | | 7/2002 |
| JP | 2007127264 A | * | 5/2007 |
| JP | 2009-222197 | | 10/2009 |

OTHER PUBLICATIONS

Machine translation of JP10288236.*
International Search Report for PCT/JP2011/67287 dated Nov. 1, 2011.

* cited by examiner

*Primary Examiner* — Bradley King
*Assistant Examiner* — Mahbubur Rashid
(74) *Attorney, Agent, or Firm* — Fish & Richardson P.C.

(57) ABSTRACT

In an air spring for a railway vehicle or the like, an upper end 3a of the flexible member 3 is attached to the upper face plate 1 at a position that is further on an outer side in a radial direction than the concave section 7. A lower end 3b of the flexible member 3 is attached to the lower face plate 2 at a position that is further on an outer side in a radial direction than the deflation stopper section 5. The deflation stopper section 5 is formed so as to have a height such that the upper end 3a and the lower end 3b of the flexible member do not contact as a result of a relative displacement in the horizontal direction between the upper face plate 1 and the lower face plate 2 at a time of deflation.

4 Claims, 3 Drawing Sheets

FIG. 5

|  |  | SAMPLE 1 | SAMPLE 2 | SAMPLE 3 | SAMPLE 4 | SAMPLE 5 | SAMPLE 6 | SAMPLE 7 |
|---|---|---|---|---|---|---|---|---|
| FIRST BUFFER LAYER | HARDNESS | A68 | A68 | A68 | A68 | A70 | A68 | A68 |
|  | LAYER THICKNESS (mm) | 10.00 | 10.00 | 10.65 | 10.95 | 11.00 | 10.50 | 10.00 |
|  | DISTORTION (mm) | 1.00 | 1.00 | 1.18 | 1.28 | 1.22 | 1.14 | 1.00 |
|  | DISTORTION FACTOR (%) | 10.0 | 10.0 | 11.1 | 11.7 | 11.1 | 10.9 | 10.0 |
|  | LAYER THICKNESS AFTER TESTING (mm) | 9.40 | 9.40 | 9.90 | 10.15 | 10.25 | 9.80 | 9.40 |
|  | LAYER THICKNESS CHANGE AMOUNT (mm) *1 | 0.60 | 0.60 | 0.75 | 0.80 | 0.75 | 0.70 | 0.60 |
|  | LAYER THICKNESS CHANGE RATE (%) | 6.00 | 6.00 | 7.04 | 7.31 | 6.82 | 6.67 | 6.00 |
| SECOND BUFFER LAYER | HARDNESS | A72 | A73 | A68 | A68 | A68 | A71 | A68 |
|  | LAYER THICKNESS (mm) | 10.00 | 10.00 | 10.00 | 10.00 | 10.00 | 10.00 | 10.00 |
|  | DISTORTION (mm) | 1.00 | 0.95 | 1.11 | 1.11 | 1.11 | 1.03 | 1.11 |
|  | DISTORTION FACTOR (%) | 10.0 | 9.50 | 11.1 | 11.1 | 11.1 | 10.3 | 11.1 |
|  | LAYER THICKNESS AFTER TESTING (mm) | 9.40 | 9.40 | 9.30 | 9.30 | 9.30 | 9.35 | 9.30 |
|  | LAYER THICKNESS CHANGE AMOUNT (mm) *1 | 0.60 | 0.60 | 0.70 | 0.70 | 0.70 | 0.65 | 0.70 |
|  | LAYER THICKNESS CHANGE RATE (%) | 6.00 | 6.00 | 7.00 | 7.00 | 7.00 | 6.50 | 7.00 |
| DISTORTION FACTOR RATE *2 |  | 1.00 | 1.05 | 1.00 | 1.05 | 1.00 | 1.05 | 1.11 |
| LAYER THICKNESS CHANGE RATE RATIO *3 |  | 1.00 | 1.00 | 1.01 | 1.04 | 1.03 | 1.03 | 1.17 |

*1 LAYER THICKNESS CHANGE AMOUNT BY WHICH LAYER THICKNESS HAS DECREASED AFTER TESTING FROM INITIAL LAYER THICKNESS

*2 VALUE OBTAINED BY DIVIDING LARGER VALUE AMONG DISTORTION FACTORS OF FIRST BUFFER LAYER AND SECOND BUFFER LAYER BY SMALLER VALUE THEREOF

*3 VALUE OBTAINED BY DIVIDING LARGER VALUE AMONG LAYER THICKNESS CHANGE RATES OF FIRST RUBBER LAYER AND SECOND BUFFER LAER BY SMALLER VALUE THEREOF

AIR SPRING

BACKGROUND OF THE INVENTION

1. Field of the Invention

The present invention relates to an air spring in which a tubular flexible member is interposed between an upper face plate and a lower face plate.

2. Description of the Related Art

A conventional air spring that is frequently used for a railway vehicle or the like includes an upper face plate that is attached to the body of the vehicle, a lower face plate that is disposed on a wheel side below the upper face plate, a tubular flexible member that is interposed between the upper face plate and the lower face plate, and an elastic mechanism (stopper) that is interposed between the lower face plate and a support frame on the wheel side. A rubber bellows or the like is used as the tubular flexible member.

Although a puncture occurs in the above described air spring in some cases, that is, the air inside the flexible member escapes (the flexible member deflates), even in such cases there is a need to ensure safe running of the vehicle. Examples of an air spring that can ensure safe running of a vehicle at a time of deflation include, for example, as disclosed in Japanese Patent Application Laid-Open No. 2009-222197, an air spring in which a stopper rubber is provided between its upper face plate and its movable plate that is capable of changing position so as to approach or move away from the upper face plate.

An annular bead receiving section that has a cross-sectional convex shape is formed in a lower face plate of the aforementioned air spring. A lower end (bead section) of a bellows is fitted to an outer circumferential side of the bead receiving section. The air spring is configured so that, at a time of deflation, the movable plate sits in an area that is enclosed by the bead receiving section of the lower face plate.

SUMMARY OF THE INVENTION

Depending on the railway line on which a vehicle runs, in some cases there is a need for an air spring that can be used under a condition in which there is a large amount of horizontal displacement. In such a case, according to the air spring with the above described structure, there is the disadvantage that an amount of horizontal displacement at a time of deflation is limited to a movable range of the movable plate within the area enclosed by the bead receiving section, and it is difficult to significantly widen that range. Further, in recent years, there is a demand for an air spring that not only ensures safe running of a vehicle at a time of deflation, but that also enables running for a long time even in a deflated state.

The present invention has been made in consideration of the above problems, and an object of the invention is to provide an air spring in which a large amount of horizontal displacement can be obtained at a time of deflation, and which enables running for a long time even in a deflated state.

An air spring according to the present invention for solving the above described problems includes: an upper face plate; a lower fce plate; a tubular flexible member that is interposed between the upper face plate and the lower face plate; a deflation stopper section that is provided in a condition protruding upward from the lower face plate, and that supports the upper face plate at a time of deflation; and a concave section that is formed in a center part of an undersurface of the upper face plate, and that sits in the deflation stopper section at a time of deflation; wherein: an upper end of the flexible member is attached to the upper face plate at a position that is located further on the radially outer side than the concave section; a lower end of the flexible member is attached to the lower face plate at a position that is located further on the radially outer side than the deflation stopper section; and the deflation stopper section is formed so as to have a height that the upper end and the lower end of the flexible member do not contact as a result of a relative displacement in a horizontal direction (hereunder, referred to as "relative horizontal displacement") between the upper face plate and the lower face plate at a time of deflation.

In the air spring, the upper face plate is formed to have a larger diameter than the lower face plate. Accordingly, as in the above described structure, by forming the deflation stopper section on the lower face plate and forming the concave section that has a larger diameter than the deflation stopper section in the upper face plate, it is possible to provide a large difference in diameter between the two sections and thus increase a relative horizontal displacement amount between the upper face plate and the lower face plate.

Further, by setting the height of the deflation stopper section so that the upper end and lower end of the flexible member do not contact therewith as the result of a relative horizontal displacement between the upper face plate and the lower face plate at a time of deflation, it is possible to make the upper end and lower end of the flexible member overlap in the horizontal direction while being in a state in which the deflation stopper section and the inner circumferential face of the concave section are contacting.

More specifically, the concave section can be formed to have a large diameter that extends to a position close to the upper end of the flexible member, and the deflation stopper section can be formed to have a large diameter that extends to a position close to the lower end of the flexible member. It is thereby possible to provide a large contact area between the deflation stopper section and the concave section and increase a displacement amount in the horizontal direction while stably supporting the upper face plate at a time of deflation.

Further, since it is possible to absorb a protrusion of the deflation stopper section into the concave section, a clearance between the upper face plate and lower face plate, which is required in order for the upper face plate to move upward and downward in a state in which air is filled in the air spring, can be adequately secured.

Accordingly, at a time that the side face of the deflation stopper section and the inner circumferential face of the concave section collide due to a relative horizontal displacement between the upper face plate and the lower face plate, it is possible to increase a collision area between the two faces and thereby alleviate an impact force applied per unit area by making the concave section a sufficient depth and making the deflation stopper section a sufficient height. Thus, deformation or damage of both the deflation stopper section and the inner circumferential face of the concave section can be prevented, and the vehicle can run for a long time in a deflated state.

According to the present invention, in addition to the above described structure, it is possible to arrange a buffer layer on at least one face among the inner circumferential face of the concave section and a side face of the deflation stopper section that opposes the inner circumferential face at a time of deflation. It is thereby possible to exert a buffering effect that decreases the discomfort of passengers by reducing a collision sound emitted when the collision occurs between the side face of the deflation stopper section and the inner circumferential face of the concave section, while alleviating an impact when the collision occurs between the side face of the deflation stopper section and the inner circumferential face of the concave section and maintaining riding comfort.

Although it is favorable to arrange a buffer layer on one face among the inner circumferential face of the concave section and the side face of the deflation stopper section that opposes the inner circumferential face at a time of deflation, it is possible to alleviate an impact force applied to the deflation stopper section and the concave section with two buffer layers by arranging a buffer layer on both of the faces. Thus, the buffering effect can be further enhanced and deterioration of the buffer layers can be suppressed.

When arranging a first buffer layer and a second buffer layer on the inner circumferential face of the concave section and the side face of the deflation stopper section that opposes the inner circumferential face at a time of deflation, respectively, it is preferable to adopt a configuration such that the respective distortion factors of the two layers when the first buffer layer and the second buffer layer collide at a time of deflation are equal to each other.

In this connection, the term "distortion factor" (%) according to the present invention refers to a numerical value (%) expressed by $(\alpha-\beta) \times 100/\alpha$ when the initial buffer layer thickness is taken as $\alpha$ (mm) and the buffer layer thickness in a state in which the collision between a side face of the deflation stopper section and an inner circumferential face of the concave section has been buffered by the buffer layer (when an external force is loaded on the buffer layer) and the buffer layer has been elastically deformed is taken as $\beta$ (mm). Further, in order for the buffer layer to exert a favorable buffering effect, the aforementioned distortion factor is preferably between 1% and 25%, and more preferably between 5% and 15%.

In order to make equal the distortion factor of the first buffer layer and the distortion factor of the second buffer layer, specifically, it is preferable that the values of the respective distortion factors of the two layers when the first buffer layer and the second buffer layer collide at a time of deflation are such that, when the value of the smaller distortion factor is taken as 1, the value of the larger distortion factor is less than or equal to 1.05.

That is, when the first buffer layer and the second buffer layer have been formed using the same buffer material and so as to have the same layer thickness, the peripheral length of the first buffer layer that is arranged on the inner circumferential face of the concave section is longer than the peripheral length of the second buffer layer that is arranged at the side face of the deflation stopper section. Accordingly, when the side face of the deflation stopper section and the inner circumferential face of the concave section collide, the pressure receiving area of the first buffer layer is larger than the pressure receiving area of the second buffer layer.

Therefore, since the same force acts on the first buffer layer and the second buffer layer when the side face of the deflation stopper section and the inner circumferential face of the concave section collide, the force applied per unit area is greater on the second buffer layer. As a result, the distortion factor of the second buffer layer is greater than the distortion factor of the first buffer layer. Thus, if the side face of the deflation stopper section and the inner circumferential face of the concave section repeatedly collide at a time of deflation, the second buffer layer, which has the larger distortion factor, deteriorates faster than the first buffer layer.

With respect to the first buffer layer and the second buffer layer, when a case in which deterioration of both layers proceeds little by little to the same degree is compared with a case in which deterioration proceeds faster in either one of the layers, it can be said that a favorable buffering effect can be maintained for a longer time in the former case.

Accordingly, as described above, by adopting a configuration such that the respective distortion factors of the first buffer layer and the second buffer layer are equal, an air spring can be provided that enables a favorable buffering effect of the air spring to be maintained for longer, and also enables running of a vehicle for a longer time while maintaining riding comfort in a deflated state.

Specifically, in order to make equal the distortion factors of the first buffer layer and the second buffer layer, when the first buffer layer and the second buffer layer are the same thickness, the distortion factors of the two layers when the first buffer layer and the second buffer layer collide at a time of deflation can be made equal by making the hardness of the second buffer layer greater than the hardness of the first buffer layer.

Further, when the hardness of the first buffer layer and the hardness of the second buffer layer are the same, the respective distortion factors of the two layers when the first buffer layer and the second buffer layer collide at a time of deflation can be made equal by making the thickness of the first buffer layer greater than the thickness of the second buffer layer.

In addition, it is also possible to make equal the distortion factors of the two layers when the first buffer layer and the second buffer layer collide at a time of deflation by adjusting the hardness and thickness of the first buffer layer and the second buffer layer.

According to the above described configuration, by adjusting the hardness or thickness, or both the hardness and the thickness, of the first buffer layer and the second buffer layer, an air spring can be provided in which the distortion factors of the two layers can be equally balanced to thereby maintain a buffering effect for a longer time, and which enables running of a vehicle over a longer time while maintaining riding comfort in a deflated state.

According to the present invention, it is possible to provide an air spring that includes a deflation stopper section provided in a lower face plate in a condition protruding towards an upper face plate, and a concave section which is formed in a center section of an undersurface of the upper face plate and in which the deflation stopper section sits at a time of deflation. The deflation stopper section is formed to be a height such that an upper end and a lower end of a flexible member do not contact as the result of a relative horizontal displacement between the upper face plate and the lower face plate at a time of deflation. Hence, an air spring can be provided that can increase a relative horizontal displacement amount between the upper face plate and the lower face plate at a time of deflation, and also enable running for a long time even in a deflated state.

DETAILED DESCRIPTION OF THE DRAWINGS

FIG. 5 is a table showing results of evaluating air springs according to an example.

DETAILED DESCRIPTION OF THE PREFERRED EMBODIMENTS

[First Embodiment]

Figure 1:
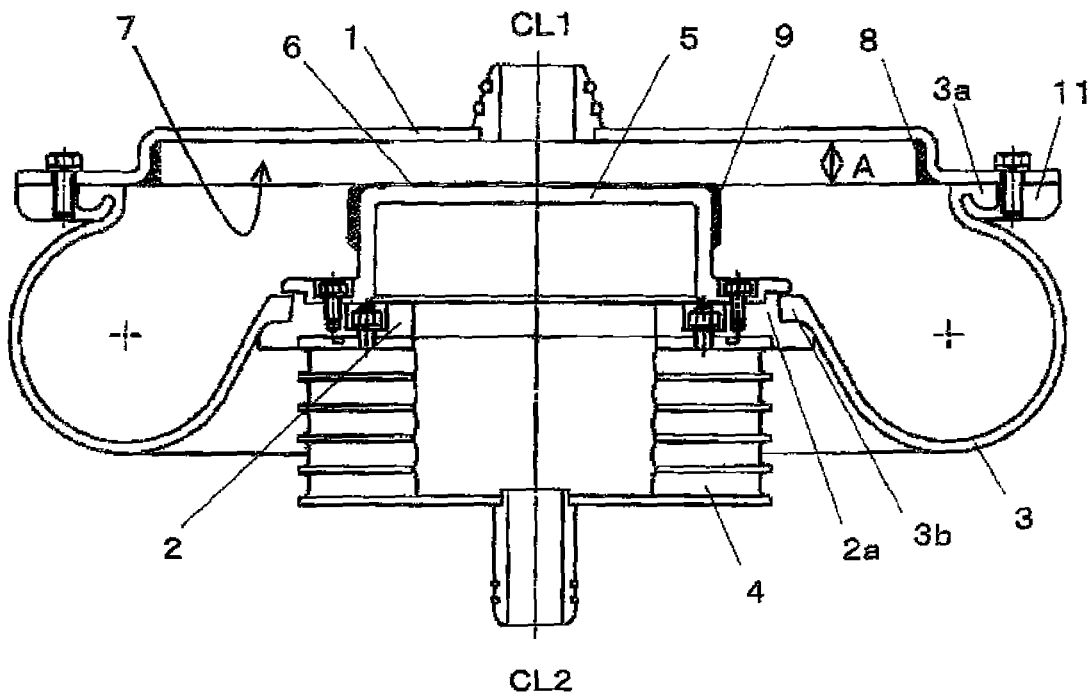
FIG. 1 is a longitudinal section of an air spring (in an air-filled state) according to a first embodiment of the present invention.
Figure 2:
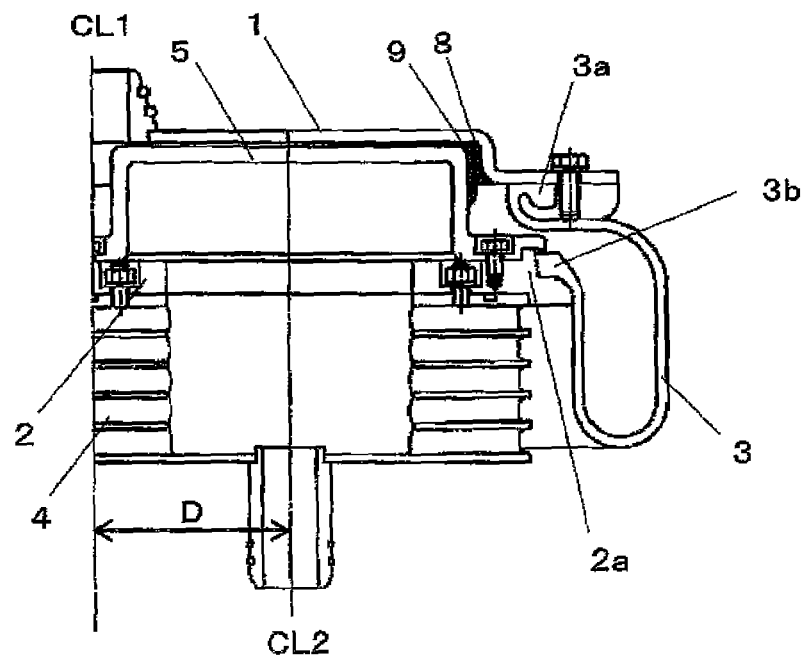
FIG. 2 is a half-sectional view illustrating a deflated state of the air spring shown in FIG. 1.

The present invention is described hereunder based on the attached drawings. FIG. 1 and FIG. 2 are drawings that illustrate a first embodiment of an air spring for a vehicle according to the present invention. FIG. 1 is a longitudinal section of an air spring, which illustrates a state in which the air spring is filled with air. FIG. 2 is a longitudinal section that illustrates the air spring in a state in which air has escaped (a deflated state) relative to the state shown in FIG. 1, and shows a half obtained when taking center lines CL1 and CL2 of the air spring as the center. In this connection, FIG. 2 shows a state in which the relative horizontal displacement amount between the upper face plate and the lower face plate is the maximum amount.

The air spring includes an upper face plate 1 that is attached to a body of a vehicle, a lower face plate 2 that is disposed on a wheel side below the upper face plate 1, a tubular flexible member 3 that is interposed between the upper face plate 1 and the lower face plate 2, and a stopper 4 that is interposed between the lower face plate 2 and a support frame on the wheel side.

According to the present embodiment, a man bellows made of rubber is used as the flexible member 3. The flexible member 3 is made of laminated rubber in which a reinforced rubber layer in which a reinforcing cord such as a steel cord has been embedded is used as an intermediate layer. A bead section in which the reinforced rubber layer is wound around a bead core is formed at an upper end 3a and a lower end 3b of the flexible member 3.

As shown in FIG. 1, the upper face plate 1 and the lower face plate 2 are formed of a metallic material in a disc shape. A cylindrical deflation stopper section 5 is formed at a center part of the lower face plate 2 in an upward direction towards the upper face plate 1. A concave section 7 (depth A) is formed at a center part in the undersurface of the upper face plate 1. At a time of deflation, the concave section 7 of the upper face plate 1 sits on an upper face of the deflation stopper section 5.

A sliding sheet 6 is adhered to the upper face of the deflation stopper section 5. The sliding sheet 6 is made of thermoplastic or thermosetting synthetic resin that can be formed into a thin and strong sheet, and a material that has a small coefficient of friction is used therefor. As specific examples thereof, fluorocarbon resin, polyethylene, and polypropylene can be mentioned. A fluorocarbon resin sheet is used according to the present embodiment.

As shown in FIG. 1, the air spring is formed so that, in a static state in which the air spring is filled with air, a center line CL1 of the upper face plate 1 and a center line CL2 of the lower face plate 2 are matching. The diameter (internal diameter) of the concave section 7 is formed to be larger than the external diameter of the deflation stopper section 5. At a time of deflation, a relative horizontal displacement is possible between the upper face plate 1 and the lower face plate 2 within a range in which the deflation stopper section 5 can move inside the concave section 7.

In other words, a relative horizontal displacement between the upper face plate 1 and the lower face plate 2 is regulated by the side face of the deflation stopper section 5 contacting the inner circumferential face of the concave section 7. In a state in which the side face of the deflation stopper section 5 contacts the inner circumferential face of the concave section 7, a deviation width D between the center line CL1 of the upper face plate 1 and the center line CL2 of the lower face plate 2 is the maximum relative horizontal displacement amount between the upper face plate 1 and the lower face plate 2.

A bead receiving section 2a is formed in the lower face plate 2 at a position that is located further on the radially outer side than the deflation stopper section 5. The lower end 3b of the flexible member 3 is fitted into the bead receiving section 2a. The upper end 3a of the flexible member 3 is fixed by a clamp 11 at a position that is located further on the radially outer side (portion that protrudes in a flange shape) than the concave section 7 of the upper face plate 1.

As shown in FIG. 2, the deflation stopper section 5 is formed to a height such that the upper end 3a and lower end 3b of the flexible member 3 do not contact therewith when the deflation stopper section 5 contacts the inner circumferential face of the concave section 7 as the result of a relative horizontal displacement between the upper face plate 1 and the lower face plate 2 at a time of deflation.

More specifically, according to the present embodiment, in order to increase the amount of a relative horizontal displacement while stably supporting the upper face plate 1 by means of the deflation stopper section 5 at a time of deflation, the concave section 7 is formed to have a large diameter that extends to a position close to the upper end 3a of the flexible member and, furthermore, the deflation stopper section 5 is formed to have a large diameter that extends to a position close to the lower end 3b of the flexible member.

Accordingly, by forming the deflation stopper section 5 to a height such that the upper end 3a and lower end 3b of the flexible member 3 do not contact therewith in a state in which the deflation stopper section 5 contacts the inner circumferential face of the concave section 7 at a time of deflation, deformation and damage of the flexible member 3 can be prevented.

In this connection, because a man bellows is used as the flexible member 3 according to the present embodiment, the diameter of the upper face plate 1 is formed to be considerably larger than the diameter of the lower face plate 2 in conformity with the flexible member 3. Consequently, the diameter of the concave section 7 can be formed to a larger diameter and a relative horizontal displacement amount between the upper face plate 1 and the lower face plate 2 can be increased.

A first buffer layer 8 and a second buffer layer 9 are formed on an inner circumferential face of the concave section 7 and a side face of the deflation stopper section 5 that opposes the inner circumferential face of the concave section 7 at a time of deflation, respectively. The material used to form each buffer layer may be any material that alleviates an impact when the deflation stopper section 5 and the inner circumferential face of the concave section 7 collide. For example, an elastic body such as rubber or elastomer can be used.

According to the present embodiment, with respect to the first buffer layer 8 and the second buffer layer 9, after making the thickness of each layer uniform, the hardness of the buffer layers 8 and 9 is adjusted so that values of the respective distortion factors of the first buffer layer and the second buffer layer are such that, when the smaller distortion factor value is taken as 1, the larger distortion factor value is less than or equal to 1.05.

Further, as another form that balances the respective distortion factors of the first buffer layer 8 and the second buffer layer 9 to the same level, a configuration may be adopted in which, after making the hardness of each layer uniform, the respective layer thicknesses of the buffer layer 8 and the buffer layer 9 are adjusted so that the distortion factor values of the first buffer layer and the second buffer layer are such that when the smaller distortion factor value is taken as 1, the larger distortion factor value is less than or equal to 1.05.

As another different form, a configuration may also be adopted in which, the thickness and hardness of the first buffer layer 8 and the second buffer layer 9 are each adjusted so that the distortion factor values of the first buffer layer and the second buffer layer are such that when the smaller distortion factor value is taken as 1, the larger distortion factor value is less than or equal to 1.05.

[Second Embodiment]

An air spring of the present embodiment differs from the air spring of the first embodiment in the respect that, in a state in which the air spring is filled with air, the deflation stopper section 5 partially overlaps into the concave section 7 by an overlap amount L. The remaining configuration of the air spring of the present embodiment is the same as in the first embodiment.

Figure 3:
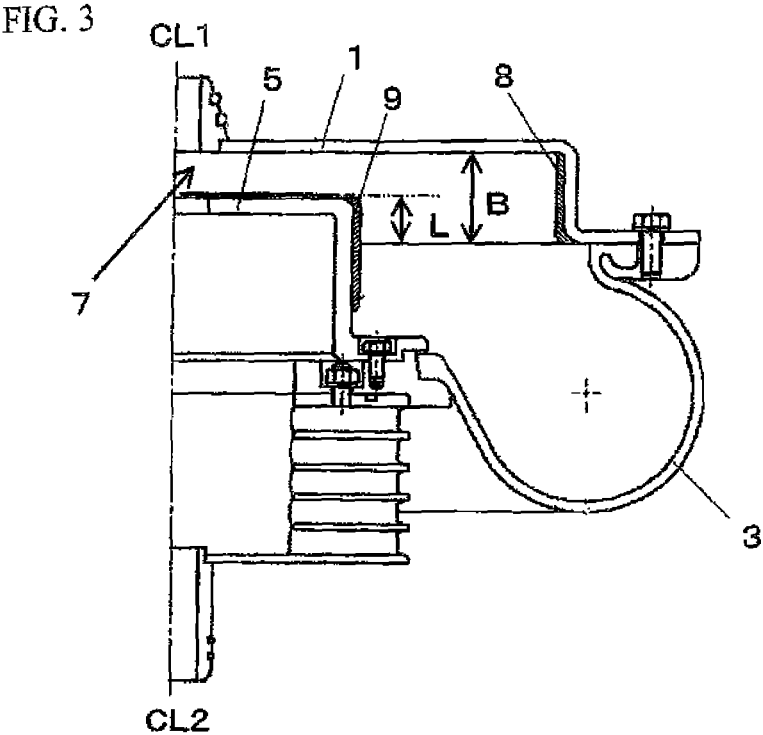
FIG. 3 is a half-sectional view of an air spring (in an air-filled state) according to a second embodiment.
Figure 4:
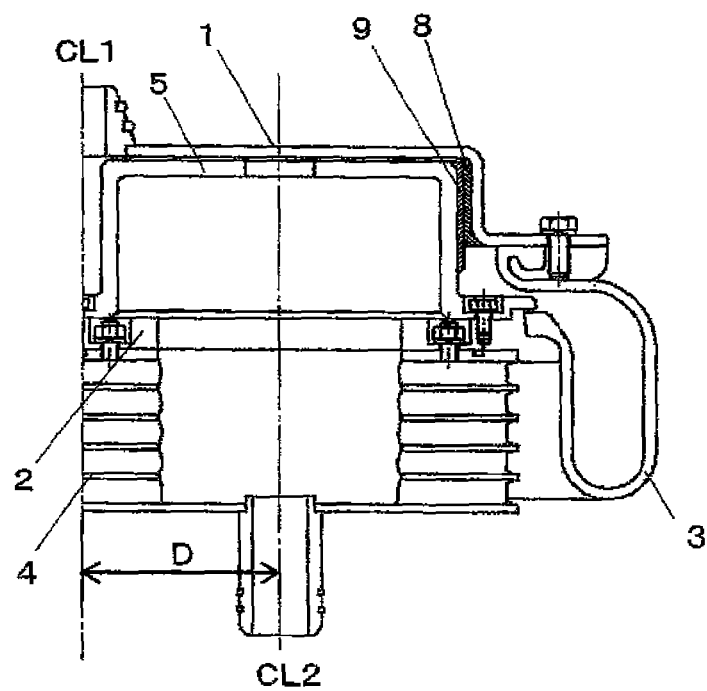
FIG. 4 is a half-sectional view illustrating a deflated state of the air spring shown in FIG. 3.

FIGS. 3 and 4 illustrate the second embodiment of the air spring. FIG. 3 is a longitudinal section of an air spring in a state in which the air spring has been filled with air. FIG. 4 is a longitudinal section illustrating a deflated state of the air spring illustrated in FIG. 3. In this connection, FIG. 3 and FIG. 4 each show a half of the air spring when the center line CL1 of the upper face plate 1 is taken as the center of the air spring. Further, FIG. 4 shows a state in which a relative horizontal displacement amount between the upper face plate and the lower face plate is the maximum amount.

As shown in FIG. 3, according to the present embodiment, in a state in which the air spring has been filled with air, since the deflation stopper section 5 partially overlaps into the concave section 7 by the overlap amount L, it is possible to regulate the amount of a relative horizontal displacement between the upper face plate 1 and the lower face plate 2 in a normal usage state of the air spring.

When causing the deflation stopper section 5 to overlap into the concave section 7 as in the present embodiment, as illustrated in FIG. 4, it is possible to secure a sufficient clearance between the deflation stopper section 5 and the concave section 7 by making a depth B of the concave section 7 deeper than the concave section depth A according to the first embodiment. Further, by making the concave section 7 a sufficient depth and making the deflation stopper section 5 a sufficient height, it is possible to increase a collision area between the concave section 7 and the deflation stopper section 5 and thereby alleviate an impact force applied per unit area.

EXAMPLE

Actual evaluation tests were conducted with respect to deterioration of the first buffer layer 8 and the second buffer layer 9 after using air springs manufactured according to the above described first embodiment in a deflated state. As the Samples, first, air springs obtained by making the thicknesses of the first buffer layer 8 and the second buffer layer 9 the same and thereafter adjusting the hardness (hardness measured in accordance with a type A durometer hardness test specified in JIS K6253; the same applies hereunder) of the first buffer layer 8 and the hardness of the second buffer layer 9 were employed as Samples 1 and 2.

Specifically, to make Sample 1, the first buffer layer 8 was made with a hardness of A68, and the first buffer layer 8 was formed so as to have a thickness of 10.00 mm on an inner circumferential face of the concave section 7 with an internal diameter of 572 mm. Further, the second buffer layer 9 was made with a hardness of A72, and the second buffer layer 9 was formed so as to have a thickness of 10.00 mm on the side face of the deflation stopper section 5 with an outer diameter of 262 mm. Furthermore, the distortion factors were adjusted such that the first buffer layer 8 and the second buffer layer 9 had the same distortion factor of 10.0%.

In this connection, according to the present example, the term "distortion factor" refers to a distortion factor of each buffer layer when the inner circumferential face of the concave section 7 and the side face of the deflation stopper section 5 were pressed together with a force of 10 kN prior to the evaluation test in a state in which the first buffer layer 8 was formed on the inner circumferential face of the concave section 7 with an internal diameter of 572 mm and the second buffer layer 9 was formed on the side face of the deflation stopper section 5 with an external diameter of 262 mm.

Further, an air spring obtained by changing the Sample 1 to obtain a hardness for the first buffer layer 8 and the second buffer layer 9 of A68 and A73, respectively, and adjusting so that a distortion factor ratio (value of larger distortion factor when value of smaller distortion factor is taken as 1) of 1.05 was obtained between the first buffer layer 8 and the second buffer layer 9 was employed as Sample 2.

Next, air springs obtained by making the hardness of the first buffer layer 8 and the second buffer layer 9 uniform, and thereafter adjusting the thicknesses of the first buffer layer 8 and the second buffer layer 9 were employed as Samples 3 and 4. Specifically, an air spring obtained by making both the first buffer layer 8 and the second buffer layer 9 with the same hardness, namely A68, thereafter forming the first buffer layer 8 so as to have a thickness of 10.65 mm and forming the second buffer layer 9 so as to have a thickness of 10.00 mm, and then adjusting so as to obtain a distortion factor ratio of 1.00 between the first buffer layer 8 and the second buffer layer 9 was employed as Sample 3.

Further, an air spring obtained by changing the Sample 3 to obtain a thickness for the first buffer layer 8 and the second buffer layer 9 of 10.95 mm and 10.00 mm, respectively, and adjusting so that a distortion factor ratio of 1.05 was obtained between the first buffer layer 8 and the second buffer layer 9 was employed as Sample 4.

Furthermore, air springs obtained by adjusting both the thickness and the hardness of the first buffer layer 8 and the second buffer layer 9 were employed as Samples 5 and 6. Specifically, an air spring in which the first buffer layer 8 with a hardness of A70 was formed to have a layer thickness of 11.00 mm and the second buffer layer 9 with a hardness of A68 was formed to have a layer thickness of 10.00 mm, and in which the distortion factor ratio between the first buffer layer 8 and the second buffer layer 9 was adjusted to be 1.00 was employed as Sample 5.

Further, an air spring in which the first buffer layer 8 with a hardness of A68 was formed to have a layer thickness of 10.50 mm and the second buffer layer 9 with a hardness of A71 was formed to have a layer thickness of 10.00 mm, and in which the distortion factor ratio between the first buffer layer 8 and the second buffer layer 9 was adjusted to be 1.05 was employed as Sample 6.

In addition, an air spring in which the first buffer layer 8 and the second buffer layer 9 were formed to have the same hardness and the same thickness was employed as Sample 7. Specifically, an air spring in which the first buffer layer 8 with a hardness of A68 was formed to have a thickness of 10.00 mm and the second buffer layer 9 with a hardness of A68 was formed to have a thickness of 10.00 mm was employed as Sample 7.

Evaluation tests were conducted under the conditions described below with respect to the seven kinds of air springs described above. That is, with respect to each of the above described air springs, the lower face plate 2 was attached to a movable arm while in a deflated state in which the concave section 7 of the upper face plate was seated on the deflation stopper section 5. In this connection, when attaching the lower face plate 2 to the movable arm, the center line of the upper face plate and the center line of the lower face plate were matched with each other, and the upper face plate 1 was fixed so as not to move in the left-to-right direction.

In this state, the movable arm was repeatedly displaced in the left-to-right direction (50,000 cycles at a frequency of 1 Hz). Thus, the inner circumferential face of the concave section 7 and the side face of the deflation stopper section 5 were caused to repeatedly collide in the left-to-right direction. In this connection, displacement of the movable arm was regulated so that an impact force of 10 kN was obtained at the time of collision between the inner circumferential face of the concave section 7 and the side face of the deflation stopper section 5. After completing the test, the layer thickness was measured at a portion at which the first buffer layer 8 and the second buffer layer 9 collided with each other, and a layer thickness change amount (layer thickness decrease amount) from the layer thickness before the test as well as a proportion of the layer thickness change amount (layer thickness change rate) with respect to the layer thickness before the test were determined.

More specifically, when an external force is repeatedly applied to a buffer layer and the buffer layer deteriorates, the layer thickness decreases and so-called a permanent set in fatigue occurs and the buffering effect decreases. The layer thickness change amount increases in accordance with the degree of deterioration of the buffer layer. Accordingly, by comparing the layer thickness change rate of the first buffer layer and the layer thickness change rate of the second buffer layer, the manner in which deterioration has progressed with respect to the first buffer layer and the second buffer layer can be determined.

More specifically, as a value of a layer thickness change rate ratio (ratio obtained when the larger value among the layer thickness change rates of the first buffer layer and the second buffer layer is divided by the smaller value thereof) approaches 1, it indicates that both layers are deteriorating evenly little by little. On the other hand, as the value of the layer thickness change rate ratio increases away from 1, it indicates that one of the layers is deteriorating more than the other layer.

The evaluation results are shown in FIG. 5. Based on the results shown in FIG. 5 it was found that for the Samples 1 to 6, in which the distortion factor ratio (ratio obtained when the larger value among the distortion factors of the first buffer layer and the second buffer layer is divided by the smaller value thereof) was less than or equal to 1.05, the layer thickness change rate ratio was a value close to 1. It was thus confirmed that the first buffer layer and the second buffer layer deteriorated evenly little by little in the samples 1 to 6.

In contrast, with respect to the Sample 7, since neither hardness adjustment nor layer thickness adjustment were performed, a difference arose between the distortion factor values of the first buffer layer and the second buffer layer, and the distortion factor ratio was a large value of 1.11. As a result, it was found that the layer thickness change rate ratio was a large value of 1.16, and one of the buffer layers deteriorated in a one-sided manner compared to the Samples 1 to 6.

Thus, it was confirmed that by adjusting the thickness and/or hardness of the buffer layers so that the distortion factor of the first buffer layer and the distortion factor of the second buffer layer become equal, a favorable buffering effect can be maintained for longer in comparison with an air spring in which the thickness and hardness of the buffer layers have not been adjusted.

What is claimed is:

1. An air spring, comprising:
an upper face plate;
a lower face plate;
a tubular flexible member that is interposed between the upper face plate and the lower face plate;
a deflation stopper section that is provided and protrudes upward from the lower face plate, and that supports the upper face plate at a time of deflation; and
a concave section that is formed in a center part of an undersurface of the upper face plate, and that sits in the deflation stopper section at a time of deflation;
wherein:
the diameter of the concave section is larger than the external diameter of the deflation stopper section and is configured so that a relative horizontal displacement is possible between the upper face plate and the lower face plate at a time of deflation;
an upper end of the flexible member is attached to the upper face plate at a position that is located further on the radially outer side than the concave section;
a lower end of the flexible member is attached to the lower face plate at a position that is located further on the radially outer side than the deflation stopper section;
the deflation stopper section is formed so as to have a height such that the upper end and the lower end of the flexible member do not contact as a result of a relative displacement in a horizontal direction between the upper face plate and the lower face plate at a time of deflation;
the relative displacement in a horizontal direction between the upper face plate and the lower face plate is regulated by a side face of the deflation stopper section contacting an inner circumferential face of the concave section; and
a buffer layer is arranged at least at one face among the inner circumferential face of the concave section and the side face of the deflation stopper section that opposes the inner circumferential face of the concave section at a time of deflation.

2. The air spring according to claim 1, wherein:
a first buffer layer is arranged on the inner circumferential face of the concave section;
a second buffer layer that has a thickness that is the same as a thickness of the first buffer layer is arranged on the side face of the deflation stopper section that opposes the inner circumferential face of the concave section at a time of deflation; and
a hardness of the second buffer layer is greater than a hardness of the first buffer layer, and respective distortion factors of both layers when the first buffer layer and the second buffer layer collide at a time of deflation become equal.

3. The air spring according to claim 1, wherein:
a first buffer layer is arranged on the inner circumferential face of the concave section;
a second buffer layer that has a hardness that is the same as a hardness of the first buffer layer is arranged on the side face of the deflation stopper section that opposes the inner circumferential face of the concave section at a time of deflation; and
a thickness of the first buffer layer is thicker than a thickness of the second buffer layer, and respective distortion factors of both layers when the first buffer layer and the second buffer layer collide at a time of deflation become equal.

4. The air spring according to claim 1, wherein:
a first buffer layer is arranged on the inner circumferential face of the concave section;
a second buffer layer is arranged on the side face of the deflation stopper section that opposes the inner circumferential face of the concave section at a time of deflation; and
both a hardness and a thickness of both the first buffer layer and the second buffer layer are different from one another, and respective distortion factors of both layers when the first buffer layer and the second buffer layer collide at a time of deflation become equal.

* * * * *